A. ROTH, Sr.
SUPPLEMENTAL HORSESHOE.
APPLICATION FILED JUNE 3, 1916.

1,191,616.

Patented July 18, 1916.

Witnesses

Anthony Roth, Sr. Inventor by

Attorneys

UNITED STATES PATENT OFFICE.

ANTHONY ROTH, SR., OF NEW BRUNSWICK, NEW JERSEY.

SUPPLEMENTAL HORSESHOE.

1,191,616.  Specification of Letters Patent.  Patented July 18, 1916.

Application filed June 3, 1916. Serial No. 101,529.

*To all whom it may concern:*

Be it known that I, ANTHONY ROTH, Sr., a citizen of the United States, residing at New Brunswick, in the county of Middlesex and State of New Jersey, have invented a new and useful Supplemental Horseshoe, of which the following is a specification.

The object of this invention is to provide a supplemental or additional horse shoe having calks for special purposes and in which the calks may be replaced or with reference to which substitute calks may be used, the construction of the same being comparatively simple and inexpensive and being such as to facilitate the application of the device to the hoof, under conditions which will insure stability and minimize the accumulation of trash or earth tending to clog and interfere with the efficiency of the same.

Further objects of the invention will appear in the following description, it being understood that changes in the form, proportions and details of construction may be resorted to within the scope of the claims without departing from the spirit of the invention.

Figure 1:
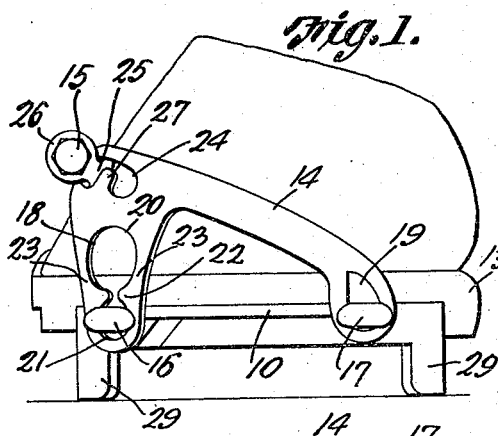
Figure 2:
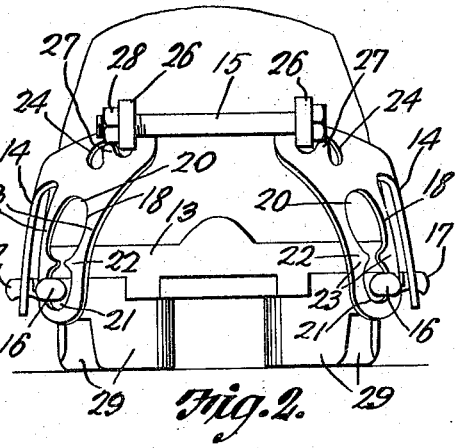
Figure 3:
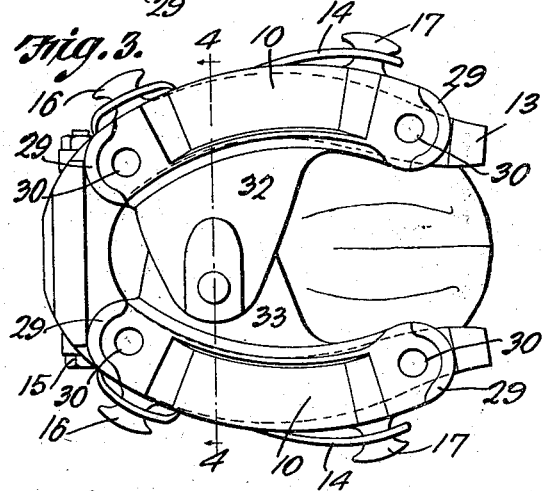
Figure 4:
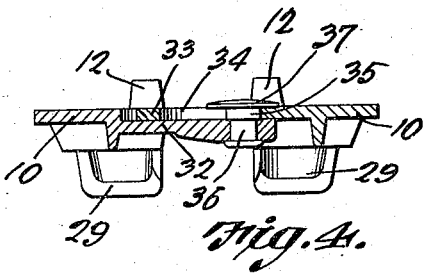
Figure 5:
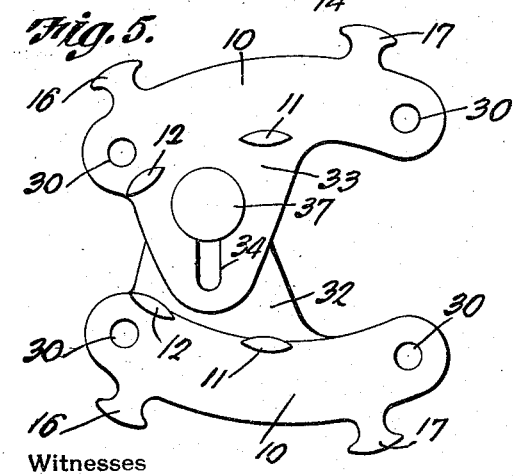
Figure 6:
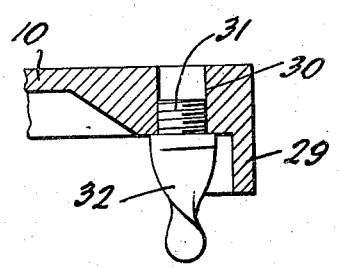

In the drawings,—Figure 1 is a side view of a preferred embodiment of the invention. Fig. 2 is a front view of the same. Fig. 3 is a bottom plan view. Fig. 4 is a transverse section on the plane indicated by the line 4—4 of Fig. 3. Fig. 5 is a plan view of the tread members, the side plates being omitted. Fig. 6 is a detail sectional view showing a supplemental or substitute calk in place.

The device consists essentially of tread members 10, of arcuate form provided preferably with bearing lugs 11 and 12 for engagement with the inner edge of the ordinary horse shoe 13, and holding means, for securing said tread members to the hoof and including side plates 14 detachably engaged with the tread members respectively, and carried forwardly and upwardly to overlap the hoof where they are connected together by an adjusting member consisting in the construction illustrated of a transverse bolt 15. Each side plate is provided with means for engaging front and rear holding lugs 16 and 17 on the tread members, said lugs preferably having elongated or elliptical heads, and the side plates being provided with keyhole slots 18 and 19 to receive the same. In applying a plate to the corresponding tread member the elongated opening or keyhole slot 19 is brought into substantial alinement with the elongated lug 17 and after having been passed over the head of the lug the plate should be swung to bring the enlarged portion 20 of the slot 18 into registration with the head of the lug 16. After this engagement has been effected, the front ends of the plates should be elevated to bring the shank of the lug 16 into the reduced portion 21 of the opening or slot 18, after which the points 22 may be brought toward each other by pinching the arm 23 of the plate 14 in which said slot 18 is formed, transverse pressure being applied to the opposite edges of said arm. In this way the side plates are secured to the tread members to prevent accidental displacement, and yet by spreading the points 22 the plates may be disconnected so as to provide for the substitution of new tread members or replace a side plate in the event of injury to either, or in the event that the tread members have become so worn as not to be useful.

The forward upper extremities of the side plates which are adapted to conform more or less accurately to the contour of the hoof, are provided with keyhole slots 24 with which are engaged the headed lugs 25 of eyes 26, a pliable tongue 27 being formed on the plates to approximately span the slots 24 so as to lock the lug in place when the eye has been positioned. The bolt is provided with terminal nuts 28 for engagement with the eyes 26, so that the desired adjustment may be secured to prevent vibration or accidental displacement of the attachment.

The construction and arrangement set forth provides for applying the desired upward strain to the tread members to hold the latter in place while not exerting any transverse inward compression at the rear of the hoof. On the other hand, the tendency is to spread the tread members at their rear ends and thereby maintain the bearing lugs 11 in snug contact with the inner edge of the shoe.

The tread members are calk bearing, as shown at 29, said calks being of horizontally curved construction, and preferably concentric therewith and under ordinary circumstances protected thereby are sockets 30 adapted for the reception of the threaded stem 31 of a supplemental calk 32 (see Fig.

6) of the twisted blade type. These supplemental calks may be employed when the main or original calks have become worn to such an extent as to be ineffective, or may be used under certain conditions when the calks rigidly secured to or formed integral with the tread members are not best adapted for the purpose. The location of the fixed calks with reference to the calk socket serves as a protection for the bases of the supplemental calks.

The tread members are connected slightly forward of their centers by adjustable means consisting of arms 32 and 33 extending inwardly from the tread members, the upper arm being longitudinally slotted as at 34 to receive the enlarged portion 35 of a rivet 36, the shoulder between said enlargement and the body of the rivet bearing upon the upper surface of the lower arm 32, and the head 37 of the rivet being flat so as to afford no means for contact with the frog of the horse's hoof. The tightening of the adjusting member or bolt 15 draws the front ends of the tread members toward each other to secure the desired adjustment of said members with reference to the hoof, said motion being of course guided by the adjustable connection above described, and the parts being held at the desired adjustment by the same means. Moreover the described arrangement of the adjustable connection with the slot formed in the upper arm serves to prevent the undue accumulation of trash, earth, etc., and minimizes the clogging of the slot and the movable parts of the structure.

What is claimed is:—

1. A supplemental horse shoe having adjustably connected calk carrying tread members, and holding means having side plates detachably connected with the tread members at the front and rear thereof, and adjusting means connecting the front ends of said plates above the plane of the tread members.

2. A supplemental horse shoe having adjustably connected calk carrying tread members, and holding means for securing the same to a hoof, said tread members being provided near their rear ends with bearing lugs for engagement with the inner edge of a horse shoe and provided at intermediate points with inwardly projecting overlapping arms the upper of which is slotted, and a headed stud carried by the lower arm to operate in said slot.

3. A supplemental horse shoe having adjustably connected calk carrying tread members, and holding means for securing the same to a hoof, the tread members having horizontally curved calks and concentric sockets for the reception of supplemental calks.

4. A supplemental horse shoe having adjustably connected calk carrying tread members, and holding means including headed front and rear studs on each tread member, side plates having keyhole slots to engage said studs and extending upwardly and forwardly to overlap a hoof, and an adjusting element connecting the side plates at said forward ends above the plane of the tread members.

5. A supplemental horse shoe having adjustably connected calk carrying tread members, and holding means including front and rear studs, having elongated heads, on the side edge of each tread member, side plates having keyhole slots to engage said headed studs, eyes having headed studs engaging keyhole slots in the forward ends of said plates above the plane of the tread members, and an adjusting bolt engaging said eyes to connect the plates.

6. A supplemental horse shoe having adjustably connected calk carrying tread members, and holding means consisting of side plates detachably connected respectively with said tread members and connected at their forward ends by an adjusting means, each side plate having front and rear elongated slots for engagement with studs on said tread members having elongated heads, the forward slot of each plate being provided with side projections to be arranged in relative positions to prevent accidental displacement of the slot from the engaged stud.

7. A supplemental horse shoe having adjustably connected calk carrying tread members, and holding means having side plates connected with said tread members at front and rear points, said plates being extended forwardly and upwardly to terminate above and in advance of the forward point of attachment to the tread members, and adjusting means detachably connected with said forward extremities of the plates.

In testimony that I claim the foregoing as my own, I have hereto affixed my signature in the presence of two witnesses.

ANTHONY ROTH, Sr.

Witnesses:
 IVY E. SIMPSON,
 PHILOMENA A. ROCKELLI.